United States Patent [19]

Dilling

[11]  4,338,091
[45]  Jul. 6, 1982

[54] PROCESS FOR LOWERING THE VISCOSITY OF SULFONATED LIGNINS

[75] Inventor: Peter Dilling, Isle of Palms, S.C.

[73] Assignee: Westvaco Corporation, New York, N.Y.

[21] Appl. No.: 292,629

[22] Filed: Aug. 13, 1981

[51] Int. Cl.$^3$ .............................. D06P 67/02; C07S 1/00
[52] U.S. Cl. ..................................... 8/524; 8/528; 8/557; 8/650; 8/908; 260/124 R
[58] Field of Search .................. 8/524, 528, 557, 650; 260/124 R

[56] References Cited

U.S. PATENT DOCUMENTS

| | | | |
|---|---|---|---|
| 2,860,113 | 6/1954 | Adler et al. | 260/124 R |
| 3,094,515 | 6/1963 | Keirstead et al. | 260/124 R |
| 3,156,520 | 11/1964 | Blaisdell | 8/528 |
| 3,726,850 | 4/1973 | Detroit | 8/524 |
| 3,769,272 | 10/1973 | Hintz | 260/124 R |
| 4,131,564 | 12/1978 | Dilling | 8/908 |
| 4,184,845 | 1/1980 | Lin | 260/124 R |

Primary Examiner—A. Lionel Clingman
Attorney, Agent, or Firm—John J. Carrara; Terry B. McDaniel; Richard L. Schmalz

[57] ABSTRACT

Disclosed herein is a process for preparing sulfonated lignins processing a low viscosity which comprises pretreating a lignin with sodium dithionate and subsequently reacting the pretreated lignin with sodium sulfite and an aldehyde. The resulting sulfonated lignins are useful as dispersants for disperse dyes and vat dyes.

10 Claims, No Drawings

4,338,091

PROCESS FOR LOWERING THE VISCOSITY OF SULFONATED LIGNINS

BACKGROUND OF THE INVENTION

(1) Field of the Invention

This invention relates to a new and improved process for preparing sulfonated lignins used as dispersants for dyestuffs and more particularly to a process for reducing the viscosity of sulfonated lignins.

(2) The Prior Art

Dyestuff compositions generally comprise a dye cake, i.e., of disperse dyes or vat dyes, and a dispersant. These dyestuff compositions are widely used to color both natural and synthetic fibers. In the dyestuff composition, the dispersant serves three basic functions:

(1) it assists in reducing the dye particle to a fine size,
(2) it maintains a dispersing medium; and
(3) it is used as a diluent.

Dye dispersants are generally one of two major types, sulfonated lignins from the wood pulping industry via the sulfite or kraft processes or napthalene sulfonates from the petroleum industry.

The advantages of employing sulfonated lignins as dispersants in dyestuff compositions is based on their unique physical properties which include good compatibility to many dye systems, outstanding dispersant characteristics at ambient and elevated temperatures and availability. There are, however, a number of disadvantages in the use of sulfonated lignins as dye dispersants. Sulfonated lignins are highly chromophoric and adsorptive in nature towards most fibers and will reduce diazo-type dyes. Their tendency to stabilize foams and to stain along with their high pH and high ash content also add to the undesirable properties of sulfonated lignins as surfactants. A number of technological developments have resulted in new methods and processes to modify sulfonated lignins to reduce the negative aspects of employing such materials as dye dispersants without simultaneously causing any major adverse effects upon those properties which render sulfonated lignins desirable as dyestuff dispersants. By way of illustration the following patents are cited.

U.S. Pat. No. 4,025,303 to G. Prazak describes a sulfonated lignin modified by reacting it with a water-soluble magnesium salt resulting in a sulfonated lignin dye dispersant having retarding properties that are capable of providing the necessary leveling in a multi-color dye process. U.S. Pat. No. 4,001,202 to P. D. Dilling and G. Prazak describes a process for modifying a sulfonated lignin useful as a dye dispersant by reacting such lignin with an epihalohydrin to eliminate fiber staining. Additional examples of reacting or modifying lignin to make them more suitable as dye dispersants include U.S. Pat. No. 4,184,845 to S. Y. Lin; U.S. Pat. No. 4,131,564 to P. Dilling; U.S. Pat. No. 3,156,520 to L. A. Baisdell; U.S. Pat. No. 3,094,515 to K. F. Keirstead et al; U.S. Pat. No. 3,726,850 to Detroit; U.S. Pat. No. 2,680,113 to E. Adler et al.; and U.S. Pat. No. 3,769,272 to Hintz. The art cited is meant to show the state of the art and is not intended to be all inclusive of lignin modifications.

In recent years, the rheological properties of the sulfonated lignin especially at the lower pH's, has become an area of concern. The Imperial Chemical Industries (ICI) in England, for example, has set viscosity standards for dispersants not to exceed 100 centipoises at pH equal to 8 and 25 percent solids concentration. One of the sulfonated lignins manufactured and sold by Westvaco Corporation under the trademark REAX ® (85A) exhibits a viscosity of greater than 400,000 centipoises at pH of 9 with occasional solidification occurring at even higher pH's.

In the past, corrective measures for the negative viscosity behavior of sulfonated lignins have been made by the introduction of additional solubilizing groups into the lignin polymer network by means of increasing the sulfonation of the lignin. In general, the use of such solubilizing groups results in a more hydrophilic sulfonated lignin causing a reduction in the adsorption of the material onto a dyestuff particle as well as a noticeable loss in the heat stability of the lignin product.

It is the general object of this invention to provide a process whereby sulfonated lignins or lignosulfonates may be treated to improve their usefulness as dye dispersants.

Another object of this invention is to provide a process for reducing the viscosity of sulfonated lignins or lignosulfonates.

Other objects, features and advantages of this invention will be seen in the following detailed description of the invention.

SUMMARY OF THE INVENTION

It has been found that the viscosity of sulfonated lignins useful as dye dispersants in dyestuff compositions can be reduced by reacting the starting lignin material with sodium dithionite ($Na_2S_2O_4$) prior to sulfonation of the lignin. It is theorized that the sodium dithionite generates sulfonation sites which ordinarily do not exist in conventional lignin matrixes, permitting a more even distribution for sulfonation to occur. This more even distribution of sulfonic acid groups in the lignin increases the solubility of the lignin and reduces the viscosity of the lignin. It is further theorized that the reduction in viscosity is achieved due to a lowering of the average molecular weight of the lignin molecules as a result of the oxygen scavaging effect of the reaction with sodium dithionite (i.e., preventing oxygen availability for coupling of two aromatic nuclei). Further viscosity reduction is achieved when the molar ratio of sodium sulfite and formaldehyde, employed to sulfomethylate the sodium dithionate treated lignin, is altered towards a higher sulfite ratio. With the exception of slightly increased azo dye reduction, the sodium dithionite treatment has no adverse effects on the properties of the sulfonated lignins prepared.

DETAILED DESCRIPTION OF THE INVENTION

Lignin is obtained from spent pulping liquors, known as black liquor, of the pulp industry where lignocellulosic materials, such as wood, straw, corn stalks, bagasse, and the like, are processed to separate the cellulose or pulp from the lignin. The lignins employed in the process of this invention are, in general, obtained from the kraft wood pulping process wherein the natural lignin is present as a sodium salt. In kraft pulping, the wood is subjected to the effects of strong alkali. The lignin in this process forms a soluble sodium salt which is separated from the cellulose by controlled acidification of the liquors containing the lignin salt. The alkali lignins are usually recovered from the black liquor as water insoluble products by precipitation procedures. Lignin obtained from the kraft, soda or other alkaline processes is not recovered as a sulfonated product, but is easily sulfonated by reacting such material with a bisulfite or sulfite. A sulfonated lignin is any lignin containing at least an effective amount of sulfonate groups to give water solubility in moderately acid and higher pH solutions.

The first step in developing a lignin-based dye dispersant is to properly sulfonate the lignin. It should be noted that the degree of sulfonation of a lignin is proportional to the solubility of that lignin in an aqueous solution and the viscosity of such lignin.

One of the conventional processes for the sulfonation of alkali lignin involves reacting the lignin with sodium sulfite and formaldehyde. This process is taught by E. Adler at al. in U.S. Pat. No. 2,680,113. Sulfonation via sulfite-formaldehyde, hereinafter referred to as sulfomethylation, acts upon the aromatic nuclei of the lignin molecule in such a manner that $-CH_2SO_3H$ groups are bonded to such nuclei. Adler teaches that the treatment of the lignin with this sulfonation agent is carried out at a temperature no higher than about 100° C. The quantity of sulfite used, calculated as anhydrous sodium sufite, may vary from about 10 percent to about 100 percent of the quantity of anhydrous lignin and the quantity of aldehyde is equivalent to the quantity of sulfite or lower, down to about 1 percent, calculated on the quantity of the anhydrous lignin material.

In the practice of the present invention, the alkali lignin is subjected to a treatment with sodium dithionite ($Na_2S_2O_4$) prior to reacting the lignin with formaldehyde and sulfite (or bisulfite). Pretreating the alkali lignin has a substantial effect on the viscosity properties of the resulting sulfonated alkali lignin. The effects of sodium dithionite on the lignin polymer appear to be complex in nature. It is believed that sodium dithionite acts as an oxygen scavenger. Oxygen is known to cause several structural changes in lignin depending upon the reaction conditions applied. One of these changes includes oxidative coupling.

The amount of sodium dithionite that can be added to the lignin prior to sulfonation can vary from about 1 percent to about 10 percent based on the weight of the lignin. From about 1 percent up to about 5 percent of sodium dithionite there appears to be a direct relationship between the amount of sodium dithionite employed and the viscosity of the resulting sulfonated lignin. By varying the amount of sodium dithionite, one can effectively regulate the viscosity of the sulfonated lignin. In most cases, the preference will be to obtain a sulfonated lignin with the lowest viscosity possible. Under such circumstances, the amount of sodium dithionite needed to pretreat the lignin would be about 5 percent based on the weight of the lignin. Employing sodium dithionite in quantities in excess of about 5 percent does not result in any substantial decreases in the viscosity of the resulting sulfonated lignin which would justify the use of additional amounts of the sodium dithionite.

The sodium dithionite is added to a lignin solution with a pH of about 10. If the pH is any lower, the chances of the lignin precipitating out of solution increase. If the pH is any higher, the resulting sulfonated lignin will generally have a higher pH which is undesirable when such material is employed as a dispersant. The pH of dyeing conditions usually range from about 5 to about 8. The higher the pH of the sulfonated lignin-dispersant, the greater the amount of acid needed to adjust the pH to the desired dyeing conditions and the greater the cost. A sulfonated lignin-dispersant with a pH of 7–8 would be ideal in minimizing the cost of acid to dyers.

After the introduction of sodium dithionite, a waiting period of about 60 minutes is recommended before sulfonation is performed for optimal results. An extended hold-up time of up to 20 hours had no harmful effect on the viscosity of the resulting sulfonated lignin. The addition of the sodium dithionite may occur from temperatures in the range of about 25° C. to about 70° C.

Once the lignin solution has been pretreated with the sodium dithionite, the resulting solution can be sulfomethylated according to the processes already outlined to yield a sulfonated lignin possessing a reduced viscosity. If an even lower viscosity is desired, the following step can be taken in addition to the pretreatment of the lignin with sodium dithionite. The additional step involves a modification in the conventional process of sulfomethylating a lignin. Under the prior art, sulfomethylation of lignin is carried out by reacting the lignin with an aldehyde and a soluble sulfite (or bisulfite), especially alkali metal sulfites. In general, the preferred reactants are sodium sulfite and formaldehyde. The two reactants are added simultaneously to the lignin solution being sulfomethylated.

The additional step in the process of sulfomethylating a lignin involves varying the mole ratio of sodium sulfite to formaldehyde. As has been stated, the prior art teaches that the quantity of aldehyde is equivalent to the quantity of sulfite or lower. When formaldehyde and sodium sulfite are combined in stoichiometric amounts, they form, almost instantaneously a hydroxy methanesulfonate, for example, $HO-CH_2SO_3Na$, which then in turn undergoes reaction with the lignin to form sulfonated lignin derivatives. The hydroxy methanesulfonate intermediate exists to only 90 percent, in the desired form, while 10 percent of the reactants are present at all times. A problem with having 10 percent of the reactants present is that the formaldehyde undergoes coupling reactions with the lignin being sulfomethylated and this coupling reaction takes place at the same site on the lignin molecules where sulfomethylation is occurring. The reduction in sulfomethylation results in a sulfonated lignin product with a lower solubility and higher viscosity. It would therefore be advantageous to have as small an amount of unreacted formaldehyde in the reaction mixture as possible. This can be accomplished by varying the mole ratio of sodium sulfite to formaldehyde. Increasing the mole ratio of sodium sulfite to formaldehyde results in the generation of a greater amount of the hydroxy methanesulfonate intermediate at the expense of remaining amounts of unreacted formaldehyde. The increased quantities and availability of sodium sulfite result in a lower degree of polymerization and, in conjunction with the improved distribution of sulfonation sites, may result in a higher degree of sulfonation.

In general the mole ratio of sodium sulfite to formaldehyde can range from about 1.1:0.6 to about 1.5:1.0, with the most preferred ratio being about 1.3:0.8. The treatment of the lignin with the aldehyde sulfite combination may be carried out in a temperature range of about 50° C. to about 100° C. Reaction time can range from about 30 minutes to about 24 hours.

With the exception of an increase azo dye reduction, the addition of sodium dithionite prior to sulfomethylation of the lignin has no detrimental effect on the properties of the sulfonated lignin product. It is believed that this phenomenon could be attributed to catechols formed during the sodium dithionite treatment. These structures can be inactivated through the use of ether, and ester forming compounds or chelating agents, such as propylene oxide, borax and magnesium salts, respectively.

The low viscosity sulfonated lignins prepared in accordance with the present invention can be employed as dispersants in dyestuff compositions. The amount of such dispersant required will vary depending upon the particular dye cake, the material to be dyed and the effect desired. Amounts up to 75 percent of the dispersant based upon the weight of dried dye cake may be used. The most important factor in determining the proper amount of dispersant composition to be used in making up the dyestuff is the particular dye cake used. Generally, this amount will vary from dye to dye.

The following are examples only and should not be construed as limiting the invention.

EXAMPLE 1

Solutions of lignin were prepared by mixing 100 gms of INDULIN ® "A", a lignin recovered from the residual pulping liquors of the kraft pulping process, with 500 ml of water. To the lignin solutions (20% solids concentration) the following percentages, by weight of lignin, of sodium dithionate were added: 0, 1, 2, 3, 4, 5. The pH of each solution was adjusted to about 10 at which total lignin solubilization occurred. After 60 minutes at temperatures between ambient and 70° C., equimolar amounts of sodium sulfite and formaldehyde were added to the solutions. Formaldehyde follows the addition of sodium sulfite in close sequence. Upon addition of both sulfomethylation ingredients, the temperature was adjusted to 70° C. After 1 hour at 70° C., the temperature was raised to 100° C. and maintained for 16 hours.

Upon cooling, a solids concentration of about 23 percent and a pH of about 10 was determined for each of the resulting solutions. p The viscosities of the sulfonated lignin product resulting from each of the solutions employing varying amounts of sodium dithionate were determined and are reported below in Table 1.

Viscosity was measured by heating the sulfonated lignin solution to about 70° C. and adding glacial acetic acid slowly until a pH of 8 was obtained. The solids concentration was adjusted to to 25 percent. A Brookfield viscometer (model LVT) was used for all measurements. Measurement took place at 25° C.

TABLE 1

| Viscosity Effects of Sodium Dithionate on Lignin | |
|---|---|
| Amount of Sodium Dithionite (Percentage by weight of lignin) | Viscosity of Sulfonated Lignin (25% Solids concentration) (centipose) |
| — | 400,000 (pH = 9) |
| 1 | 400 (pH = 8) |
| 2 | 100 (pH = 8) |
| 3 | 60 (pH = 8) |
| 4 | 35 (pH = 8) |
| 5 | 27.5 (pH = 8) |

The data in Table 1 clearly indicates that the treatment of a lignin solution with sodium dithionite prior to sulfomethylation results in a sulfonated lignin product possessing a low viscosity.

EXAMPLE 2

Solutions of lignin were prepared by mixing 100 gms of INDULIN ® "A", a lignin recovered from the residual pulping liquors of the kraft pulping process, with 500 ml of water. To the lignin solutions (20% solids concentration) 3 percent, by weight of lignin, of sodium dithionate was added. The pH of the solutions were adjusted to about 10 at which total lignin solubilization occurred. After 60 minutes at temperatures between ambient and 70° C., sodium sulfite and formaldehyde were added to the solutions in molar ratios of sodium sulfite to formaldehyde varying from about 1.0:0.5 to about 2.0:0.8. Formaldehyde follows the addition of sodium sulfite in close sequence. Upon addition of both sulfomethylation ingredients, the temperature was adjusted to 70° C. After 1 hour at 70° C. the temperature was raised to 100° C. and maintained for 16 hours.

The viscosities of the sulfonated lignin product resulting from each of the solutions employing varying molar ratios of sodium sulfite to formaldehyde was determined and are reported below in Table 2.

Viscosity was determined in accordance with the procedures outlined in Example 1.

TABLE 2

| Effect of Increased Mole Ratio of Sodium Sulfite on Lignin Viscosity | | |
|---|---|---|
| Mole Ratio of Sodium Sulfite to Formaldehyde (per 1,000 gms Lignin) | Amount of Sodium Dithionate (Percentage by weight of lignin) | Viscosity of Sulfonated Lignin (25% solids concentration) (centipoise) |
| 1.0/0.5 | 3 | 1625 |
| 1.5/0.5 | 3 | 122 |
| 1.5/0.75 | 3 | 21 |
| 1.5/1.00 | 3 | 29 |
| 1.3/0.80 | 3 | 23.0 |
| 1.3/0.50 | 3 | 132.0 |
| 1.2/0.7 | 3 | 25.7 |
| 1.1/0.6 | 3 | 615.0 |
| 2.0/0.80 | 3 | 18 |
| 2.0/1.15 | 3 | 24 |

The data in Table 2 clearly indicates that the increase in the amount of sodium sulfite used in the sulfomethylation of lignin as compared to the amount of formaldehyde employed results in a reduction of the viscosity of the sulfonated lignin product obtained.

While the foregoing examples have illustrated an embodiment of the invention, it should be understood that other varitions and modifications falling within the scope of the appended claims are to be included therein.

What is claimed is:

1. A process for preparing sulfonated lignins possessing low viscosity which comprises the steps of:
   (a) treating an aqueous lignin solution obtained from an alkaline wood pulping process with from about 1 percent to about 10 percent of sodium dithionate, based on the weight of lignin; and
   (b) subsequently reacting the sodium dithionite treated lignin with a water soluble sulfite (or bisulfite) in combination with an aldehyde.

2. The process according to claim 1 wherein the amount of sodium dithionite is about 5 percent, based on the weight of lignin.

3. The process according to claim 1, wherein the lignin solution is adjusted to a pH of about 10 prior to the treatment with sodium dithionate.

4. The process according to claim 1, wherein the sodium dithionate is added to the lignin solution at a temperature ranging from about 25° C. to about 70° C.

5. The process according to claim 1, wherein the water soluble sulfite is sodium sulfite.

6. The process according to claim 1, wherein the aldehyde is formaldehyde.

7. The process according to claim 1, wherein the mole ratio of water soluble sulfite to aldehyde ranges from about 1.1:0.6 to about 1.5:1.0.

8. The process according to claim 1, wherein the mole ratio of water soluble sulfite to aldehyde is about 1.3:0.8.

9. The process according to claim 1, wherein the sodium dithionite treated lignin is reacted with the water soluble sulfite and the aldehyde about 60 minutes after treatment with sodium dithionite.

10. A dyestuff composition comprising a disperse or vat dye cake and up to 75 percent, by weight of said dyestuff composition, of a dispersant comprised of a sulfonated lignin produced by the process of claim 1.

* * * * *

UNITED STATES PATENT AND TRADEMARK OFFICE
CERTIFICATE OF CORRECTION

PATENT NO. : 4,338,091
DATED : July 6, 1982
INVENTOR(S) : Peter Dilling

It is certified that error appears in the above-identified patent and that said Letters Patent is hereby corrected as shown below:

Column 5, line 38, delete "p" following the end of the sentence.

Signed and Sealed this

Sixteenth Day of November 1982

[SEAL]

Attest:

GERALD J. MOSSINGHOFF

Attesting Officer     Commissioner of Patents and Trademarks